United States Patent Office 3,242,734
Patented Mar. 29, 1966

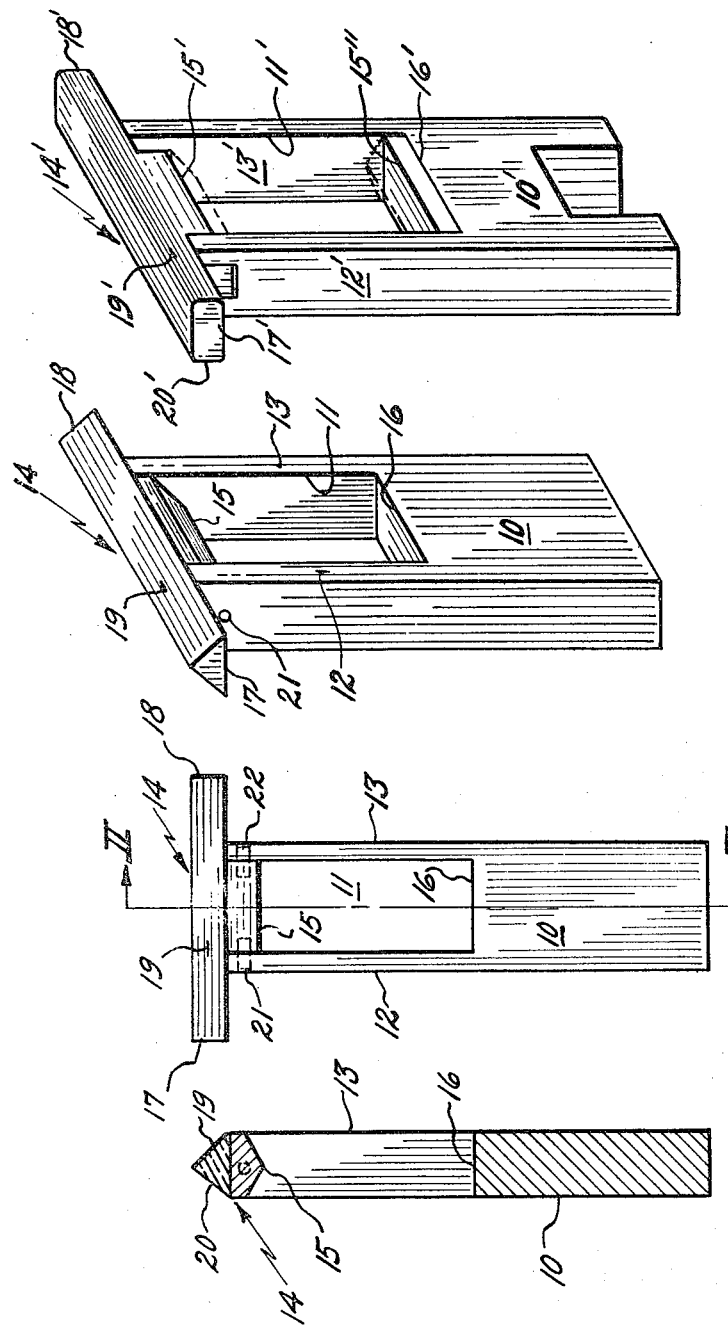

3,242,734
PENDULUM FOR GRAVITY DETERMINATION
Lloyd G. D. Thompson, 15 Minuteman Lane,
Lexington, Mass.
Filed Oct. 18, 1961, Ser. No. 146,048
4 Claims. (Cl. 73—382)

The invention described herein may be manufactured and used by or for the United States Government for government purposes without payment to me of any royalty thereon.

This invention relates generally to a pendulum and more particularly to a pendulum in the shape of a relatively small-sized flat bar which is easily adjusted for obtaining a specified period.

The pendulum method has been used for relative gravity measurements since the early nineteenth century and still plays an essential part in the gravity art. Heretofore, the equipment necessary to perform gravity measurements was fairly large in size and required long periods of time in order to set up and stabilize the equipment, take the required measurements, and re-set up the equipment with a different orientation for additional measurements. With the advent of controlled parameters in pendulum survey equipment a reduction in size of the pendulum became feasible such that smaller encompassing cases could be used, thereby increasing the accuracy of the resultant equipment and also allowing for higher degrees of vacuum with smaller auxiliary equipment. A description of equipment with which the pendulum constructed in accordance with the teachings of this invention may be found in my copending application, Serial Number 146,050, now Patent No. 3,173,297 filed on an even date herewith.

The particular shape of the pendulum of this invention allows for easy adjustment of the period. The full period of a pendulum, constructed in accordance with the constructional embodiment to be described, may be in the order of a half-second while the conventional quarter metre pendulums have a half-period of an half-second, thus the new design allows for excellent timing accuracy with smaller apparatus.

Accordingly, it is a primary object of this invention to provide a novel flat bar type of pendulum.

It is another object of this invention to provide a pendulum needing a very small space in which to swing.

It is still another object of this invention to provide a pendulum of smaller size than that currently used which allows for excellent timing accuracy and decreased size of the remainder of the gravity measuring apparatus with which it is to be used.

It is a further object of this invention to provide a pendulum suitable for use in gravity apparatus in which the variable factors affecting the pendulum period such as temperature, arc, pressure, etc., are accurately controlled.

It is a still further object of this invention to provide a pendulum that may be of non-magnetic material suitable for use in a temperature controlled gravity apparatus.

Another object of this invention involves a pendulum design which is facile of manufacture and assembly.

These and other advantages, features and objects of the invention will become more apparent from the following description taken in connection with the illustrative embodiment in the accompanying drawings, wherein:

FIGURE 1 is a front view of the pendulum;
FIGURE 2 is a cross section along lines II—II of the pendulum of FIGURE 1;
FIGURE 3 is an isometric of the pendulum body and knife edge block; and
FIGURE 4 is an isometric view of a reversible pendulum.

The bar-type pendulum, as seen in FIGURES 1 and 3, is comprised of a flat bar which forms the pendulum body 10. A portion of the bar is removed at 11 leaving two upstanding arms 12 and 13. A knife edge block 14 is mounted on the pendulum body and is comprised of a knife edge 15 extending between the arms 12 and 13 in a position opposite surface 16 of cut out portion 11. The knife edge block 14 also has supporting arms 17 and 18 extending beyond the pendulum body as can best be seen in FIGURES 1 and 3. Mirror surfaces 19 and 20 on 45° bends are provided on the supporting arms for use with an optical system for timing.

The above-described pendulum may be constructed in a variety of ways. For example, the entire device may be machined from a solid bar with no screws or wedges; however, this method requires that the pendulum knife edges be ground in situ and the entire pendulum must be of knife edge material such as Stellite, chrome steel or quartz. The preferred method is to manufacture the pendulum in two pieces of material having nearly the same coefficient of expansion. The pendulum body 10 would be machined from a solid bar of material such as bronze, stainless steel or molybdenum, while the knife edge block assembly would be separately machined, the edge 14 ground, and the mirrored surfaces 19 and 20 polished and aluminized. The entire knife edge block 14 may be made of hard chrome steel or the knife edge 15 may be of chrome steel fused to a block of the same material as the pendulum body 10 or of agate, quartz or chrome steel imbedded in a block of the pendulum body material. When the pendulum is made of two pieces, it is contemplated that they will be secured together by conventional means at 21 and 22.

Since the pressure and temperature of the equipment described in my afore-mentioned copending application, with which this equipment may be used, are accurately controlled, the use of Invar as the pendulum material may be avoided, thereby eliminating the cumbersome coils and auxiliary equipment necessary to avoid the undesirable magnetic properties of this material.

The mirrors 19 and 20 in FIGURES 1–3 are shown as bevelled surfaces for the fictitious pendulum method of timing in which a light beam entering vertically downwards is reflected from one pendulum to another in a bi-pendulum apparatus and then back up in a vertical direction to a detector or slit for recording purposes. The mirrors may have various orientations depending upon the method of timing to be utilized. The mirrors may, for example, be parallel to each other as shown at 19' and 20' on the faces of a rectangular block 14' as shown in FIGURE 4.

The supporting arms 17 and 18 may be replaced by designs other than that shown; however, the assembly as shown in FIGURE 3 has the advantage of ease of manufacture while at the same time providing large mirror surfaces. In addition, the design enables the use of simple positioning means when the pendulum is used in apparatus of the type described in my afore-mentioned copending application. The arm portions 17, 18 and 17', 18' may be omitted where a pick-up is not utilized.

It should be understood that the knife edges may be replaced with optical flats for general application; however, for relative gravity determinations having the knife edge on the pendulum makes each pendulum a single identity, whereas having an optical flat on the pendulum creates an effective change in the identity of the pendulum depending on the knife edge on which it swings.

Optical flats are desired for reversible pendulums so that the same knife edge can be used for all swings. The pendulum of this invention could easily be modified in accordance with FIGURE 4 to become a reversible pendulum.

In FIGURE 4, corresponding elements to that of FIGURE 3 have the numerals with a prime. Optical flats 15' and 15" are utilized to replace knife edges. The optical flat 15" allows for reversibility of the pendulum. Thus, it can be seen that the device of FIGURE 4 is similar to that of the embodiment of FIGURE 3 and differs from it by the shape of blocks 14 and 14', the substitution of optical flat 15' for knife edge 15 and the addition of the second optical flat 15" which is located at the bottom of the cutout portion such that it is at the center of the percussion (oscillation). As shown in phantom lines in FIGURE 4, both 15' and 15" may be knife edges.

The pendulum of FIGURES 1 through 3 having a desired period of .5 second have been made of a 4" x ½" block. Either lengthening or shortening of the period may be achieved by merely varying the length of the pendulum block. The embodiment of FIGURE 4 would have similar dimensions to that of the previously described dimensions of FIGURES 1 through 3 with the exception that the second optical flat 15" would occupy a ⅛ inch portion of the cutout 11; therefore, the cutout is ⅛ inch longer. Adjustment of the period of this pendulum would be achieved by removal of material from the bottom portion thereof.

Although the invention has been described with reference to particular embodiments, it will be understood to those skilled in the art that the invention is capable of a variety of alternative embodiments within the spirit and scope of the appended claims.

I claim:
1. A reversible pendulum comprising a flat bar of rectangular cross-section, said bar having a rectangular opening extending from one end of said bar along a portion of the length thereof, means forming a closure for the opening at said one end of said bar, and means at the base of said opening opposite said first-mentioned means, both of said means providing for the suspension of said pendulum.

2. A pendulum as defined in claim 1 wherein both of said means include knife edges.

3. A pendulum as defined in claim 1 wherein both of said means include optical flats.

4. A pendulum as defined in claim 1 wherein said second mentioned means is located at the center of percussion of said pendulum.

References Cited by the Examiner
UNITED STATES PATENTS 2,090,713    8/1937    Wilson _____ 73—382

OTHER REFERENCES

Swick: "Modern Methods for Measuring the Intensity of Gravity" (1921) Dept. of Commerce, U.S. Coast and Geodetic Survey—Special Publication No. 69 pages 11–14.

Brown: "A Determination of the Relative Values of Gravity at Potsdam and Washington" (1936) U.S. Dept. of Commerce, Coast and Geodetic Survey—Special Publication No. 204 Figure 2, between pages 4 and 5.

Swick, C. H.: Pendulum Gravity Measurement and Isostatic Reductions, U.S. Dept. of Commerce, Coast and Geodetic Survey, Special Publication 232, 1942.

RICHARD C. QUEISSER, *Primary Examiner.*

DAVID SCHONBERG, *Examiner.*

H. J. ROPER, L. R. FRANKLIN, *Assistant Examiners.*